United States Patent
Correia

(10) Patent No.: US 6,675,599 B1
(45) Date of Patent: Jan. 13, 2004

(54) PORTABLE RECTANGULAR TABLETOP PICNIC COOLER

(75) Inventor: Michael Correia, North Haven, CT (US)

(73) Assignee: Michael N. Correia, North Haven, CT (US)

(*) Notice: Subject to any disclaimer, the term of this patent is extended or adjusted under 35 U.S.C. 154(b) by 0 days.

(21) Appl. No.: 10/406,128

(22) Filed: Apr. 3, 2003

(51) Int. Cl.[7] .................................................. A47F 3/04
(52) U.S. Cl. ........................................ 62/246; 62/457.2
(58) Field of Search ............................ 62/457.2, 451.3, 62/457.4, 246; 220/592.03

(56) References Cited

U.S. PATENT DOCUMENTS

| | | |
|---|---|---|
| 108,989 A | 11/1870 | Elison |
| 271,241 A | 1/1883 | Hobbs |
| 767,321 A | 8/1904 | Wheldon |
| 1,647,785 A | 11/1927 | Coughlin |
| 1,857,545 A | 5/1932 | Hill |
| 1,867,455 A | 7/1932 | Humphrey |
| 1,889,765 A | 12/1932 | Switkes |
| 2,252,237 A | 8/1941 | Stiles |
| 2,614,397 A | 10/1952 | Petty |
| 3,016,129 A | 1/1962 | King, III |
| 3,020,113 A | 2/1962 | Molitor |
| 3,025,947 A | 3/1962 | Hammer |
| 3,130,288 A | 4/1964 | Monaco et al. |
| 3,241,706 A | 3/1966 | Monaco et al. |
| 3,347,346 A | 10/1967 | Young |
| 3,371,816 A * | 3/1968 | Ricci ........................ 220/4.28 |
| 3,424,510 A | 1/1969 | Moon |
| 3,710,589 A | 1/1973 | Brown et al. |
| 4,018,585 A | 4/1977 | Loratto |
| 4,106,597 A | 8/1978 | Shook et al. |
| 4,238,934 A * | 12/1980 | Hotta ........................... 62/457 |
| 4,336,883 A | 6/1982 | Krug et al. |
| 4,375,758 A | 3/1983 | Simmons |
| 4,572,598 A | 2/1986 | Moore, Jr. |
| 4,574,594 A | 3/1986 | Simmons et al. |
| 4,662,188 A | 5/1987 | Hullihan |
| 4,785,957 A * | 11/1988 | Beck et al. ................. 220/4.28 |
| 4,852,741 A | 8/1989 | Van Benschoten |
| 5,257,509 A | 11/1993 | Harris |
| 5,307,647 A * | 5/1994 | McClure ....................... 62/371 |
| 5,605,056 A * | 2/1997 | Brown et al. ............... 62/457.4 |
| 5,727,857 A | 3/1998 | Smith |
| 5,941,016 A * | 8/1999 | Welcher ......................... 43/55 |
| 5,975,334 A * | 11/1999 | Mayo .................... 220/592.03 |
| 6,151,910 A * | 11/2000 | Hazen ........................ 62/457.2 |
| 6,282,916 B1 * | 9/2001 | Price ........................... 62/371 |
| 6,318,114 B1 * | 11/2001 | Slaughter ................... 62/457.2 |
| 6,370,885 B1 * | 4/2002 | Jennings et al. ............... 62/56 |

* cited by examiner

Primary Examiner—Melvin Jones

(57) ABSTRACT

A portable rectangular tabletop picnic cooler is designed in the configuration of a briefcase and consists of a transparent rectangular lid for displaying food and keeping food cold while on ice. The cooler comprises of a rectangular base, front, rear and side walls, while defining a cavity. Rear side walls elevate the cooler allowing melted ice water to be directed to a drain hole located through the base, connected is a drain hole cap. The lid is hinged to the rear wall. A carrying handle is coupled to the exterior front wall. A handle is coupled to the top front of lid, to aid in opening and closing the lid. A flexible strap is secured to the to the exterior front wall to aid in transport.

7 Claims, 5 Drawing Sheets

PORTABLE RECTANGULAR TABLETOP PICNIC COOLER

FIELD OF INVENTION

The present invention relates to a portable rectangular tabletop picnic cooler that enables picnic food to remain cold for an extended period of time while on ice.

DESCRIPTION OF PRIOR ART

The use of portable picnic coolers is known in prior art. More specifically, portable coolers heretofore devised and utilized for the purpose of storing food and beverage items and keeping them cold. Prior art also illustrates an abundance of food serving apparatus, which require refrigeration units or mechanical means thereof. Prior art also illustrates tabletop salad bars and coolers that are known to consist basically of familiar, expected and obvious structural configurations, not withstanding the myriad of designs encompassed by the crowded prior art, which have been developed for the fulfillment of countless objectives and requirements. In addition, the prior art fails to describe a portable rectangular tabletop picnic cooler that is comprised of a dome less transparent lid that does not need to be assembled or disassembled.

U.S. Pat. No. 4,662,188 issued to Hullihan on May 5, 1987, U.S. Pat. No. 5,257,509 issued to Harris on Nov. 2, 1993, U.S. Pat. No. 3,347,346 issued to J. R. Young on Oct. 17, 1967, and U.S. Pat. No. 4,106,597 issued to Shook et Al on Aug. 15, 1978 illustrates portable food containers having a rectangular base and lid enclosure. However, none of the above containers have a rectangular transparent lid or a drain hole that is located through the base.

U.S. Pat. No. 5,727.857 issued to Smith on Mar. 17, 1998 and U.S. Pat. No. 4,852,741 issued to Van Benschoten on Aug. 1, 1989 illustrate portable knockdown food containers. However the containers have to be assembled and disassembled before and after use. Both containers have domed shaped transparent lids but neither lid is hingely attached to a base.

U.S. Pat. No. 767,321 issued to F. W. Wheldon on Aug. 9, 1904 illustrates a rectangular refrigerator that uses ice as the cooling agent and has a drain hole located through the base. However the refrigerator does not have a rectangular transparent hinged lid and it is not equipped with a carrying handle U.S. Pat. No. 271,241 issued to J. Hobbs on Jan. 30, 1883 illustrates an apparatus for treating artificial butter while being placed on ice. However the apparatus does not have a transparent hinged lid or a carrying handle.

U.S. Pat. No. 1,857,545 issued to C. V. Hill on May 10, 1932. U.S. Pat. No. 2,252.237 issued to E. M. Stiles on Oct. 2, 1939 and U.S. Pat. No. 1,647,785 issued to R. J. Coughlin on Nov. 1, 1927 illustrate storage containers tat have the means to display cooled food items. However they are too expensive to build, too large and are not portable.

U.S. Pat. No. 4,574,594 issued to Simmons et Al. on Mar. 11, 1986, U.S. Pat. No. 4,572,598 issued to Moore Jr. on Feb. 25, 1986, and U.S. Pat. No. 4,375,758 issued to Simmons on Mar. 8, 1983 illustrated are a portable ice table and a self serve type salad bar both of which use ice as the cooling agent. However neither have a rectangular transparent lid that protects the cold food items from ambient air temperatures.

U.S. Pat. No. 3,130,288 issued to F. F. Monaco Et Al on Apr. 21, 1964, U.S. Pat. No. 3,710,589 issued to Brown et Al on Jan. 16, 1973 and U.S. Pat. No. 3,241,706 issued to F. F. Monaco Et Al on Mar. 22, 1966 illustrate a plurality of food service containers and refrigerated devices that use ice as the cooling agent. Many of which have dome like lids that aid in maintaining the freshness of the foot items placed inside the container. However none of these patents have been constructed with a drain hole that is located on the bottom of the base. Unlike my present invention, none of these patents have been constructed so that the base is elevated to allow melted ice water to be directed from the back of said base to the front, where the drain hole is located.

U.S. Pat. No. 108,989 issued to J. Elison on Nov. 8, 1870, U.S. Pat. No. 3,025,947 issued to A. D. Hammer on Mar. 20, 1962, and U.S. Pat. No. 4,336,883 issued to Krug et Al on Jun. 29, 1982 illustrates a lunch box3, a portable lunch box and an insulated container respectively. All of which are designed to keep food items fresh within an enclosure. However none of these inventions have a transparent hinged lid or a drain hole.

U.S. Pat. No. 3,016,129 issued to E. G. King III on Jan. 9, 1962, U.S. Pat. No. 1,889,765 issued to L. Switkes on Dec. 6, 1932, U.S. Pat. No. 1,867,455 issued to C. S. Humphrey on Jul. 12, 1932, and U.S. Pat. No. 4,018,585 issued to Loratto on Apr. 19, 1977 and U.S. Pat. No. 2,614,397 issued to R. E. Petty on Oct. 21, 1952 illustrated are rectangular briefcase type containers some of which may contain a lid, a carrying handle and or both. However none of them have a transparent hinged lid or have been constructed so that the base is elevated to allow melted ice water to be directed from the back of said base to the front, where the drain hole is located.

U.S. Pat. No. 3,020,113 issued to V. D. Molitor on Feb. 6, 1962 and U.S. Pat. No. 3,424,510 issued to H. J. Moon on Jan. 28, 1969 illustrates food display carts with transparent dome type lids. However these carts are designed with four legs that extend down and have wheels attached to the bottom of each leg, which allows the cart to be pushed along the floor. These carts do not have a drain hole and are not intended for tabletop use.

While these devices fulfill their respective, particular objectives and requirements, the aforementioned patents do not disclose a new rectangular tabletop picnic cooler which is comprised of a dome less transparent lid that is hingedly secured to a base, where said base is constructed so that the base is elevated to allow melted ice water to be directed from the back of said base to the front, where the drain hole is located.

SUMMARY OF THE INVENTION

The present invention is a portable rectangular tabletop picnic cooler in the configuration of a briefcase or attache case, or similar there of. The ideal material used to construct the cooler preferably is a lightweight and durable injection molded thermoplastic or other plastic means. The cooler enables cold food items to remain cold for an extended period of time using ice as the cooling agent. The cooler is uniquely designed with a rectangular transparent hinged lid that allows the individual user to view the food items that are placed into the cooler. For example, if the individual user does not want any of the items placed in said cooler then the lid remains in the closed position. This allows the food inside the cooler to remain cold by not exposing the contents of said cooler to ambient air temperatures, every time the lid is open. The cooler can be used indoors and outdoors. When used outdoors a flexible drain hose may be pushed onto the bottom of the drain hole to direct the melted ice water away from the picnic area. If used indoors the drain hole plug can remain in place or a flexible drain hose may be directed into a bucket.

One object of my invention is to provide a cooler that can be inexpensively made and durable and widely available to the public. A lightweight cooler that can be manufactured in a variety of eye appealing colors. Another objective is to provide a cooler that can be easily carried and easily stored. Yet another object of my invention is to a provide a cooler that does not need to be assembled or disassembled before or after use. It is also widely known that sometimes whether it be at a picnic, party or social gathering not everyone arrives at the same time, this cooler fulfills another objective by allowing cold food items to remain cold for an extended period of time while on ice. Another objective of my invention is to provide a cooler that can receive a multitude of different serving dishes such as plates, pots, Tupperware, and the like. Ideally the cooler is meant to be used with inexpensive aluminum tins. Using aluminum tins may minimize cleanup time and may cut down on household water use. For example, after a picnic is over and items need to be removed from the cooler, the aluminum tins may be thrown out which eliminates the time and water that would have been spent to clean other serving dishes that may have been used instead aluminum foil tins.

This new design results in a new rectangular tabletop picnic cooler, which is not anticipated rendered obvious, suggested, or even implied by any prior art. To attain this, the present invention generally comprises of a rectangular base and perimeter walls that extend upwardly around said rectangular base creating a rectangular cavity within the said perimeter walls. A transparent rectangular lid comprising of four perimeter sidewalls, a front, a back and two sides is put together in a picture frame configuration or a likeness thereof. A transparent material or means is then placed within the interior space of lid perimeter walls. For example, it would be like taking a picture and placing it into a picture frame, but the picture in my present invention would be a transparent material such as PLEXIGLASS or similar means thereof. The transparent lid is then hingedly coupled to the back wall of the perimeter rear wall at the top edge of said perimeter rear wall. Coupled to the bottom of the sidewalls of said lid is a hinge means that allows said lid to be opened and to remain in the open position in a plurality of different angles. Said base had a drain hole that is located toward the front of the cooler, and extends through the bottom of said base. From the bottom of said base said drain hole extends downwardly a short distance from said base. Coupled to said drain hole extension is a drain hole plug means. This allows the drain hole to be plugged if needed.

At the rear of the cooler only both sidewalls extend downwardly a short distance. These extensions act like legs under said base. This gives the cooler if viewed from the side, an L-shape configuration. This L-shape configuration elevates the rear of the cooler allowing melted ice water to be more easily directed to the drain hole. Coupled to the front wall of the cooler is a flexible strap means and coupled to the top front of the lid is a means to receive said flexible strap. For example a strapping means could be VELCRO. A handle is coupled to the top front of said lid and a carrying handle is coupled to the front exterior wall of perimeter wall that extends upwardly from said base.

Therefore, the foregoing is considered as illustrative only of the principles of the invention. Further, since numerous modifications and changes will readily occur to those skilled in the art, it is not desired to limit the invention to the exact construction and operation shown described, and accordingly all suitable modifications and equivalents may be resorted to, falling within the scope of the invention.

Figure 1:
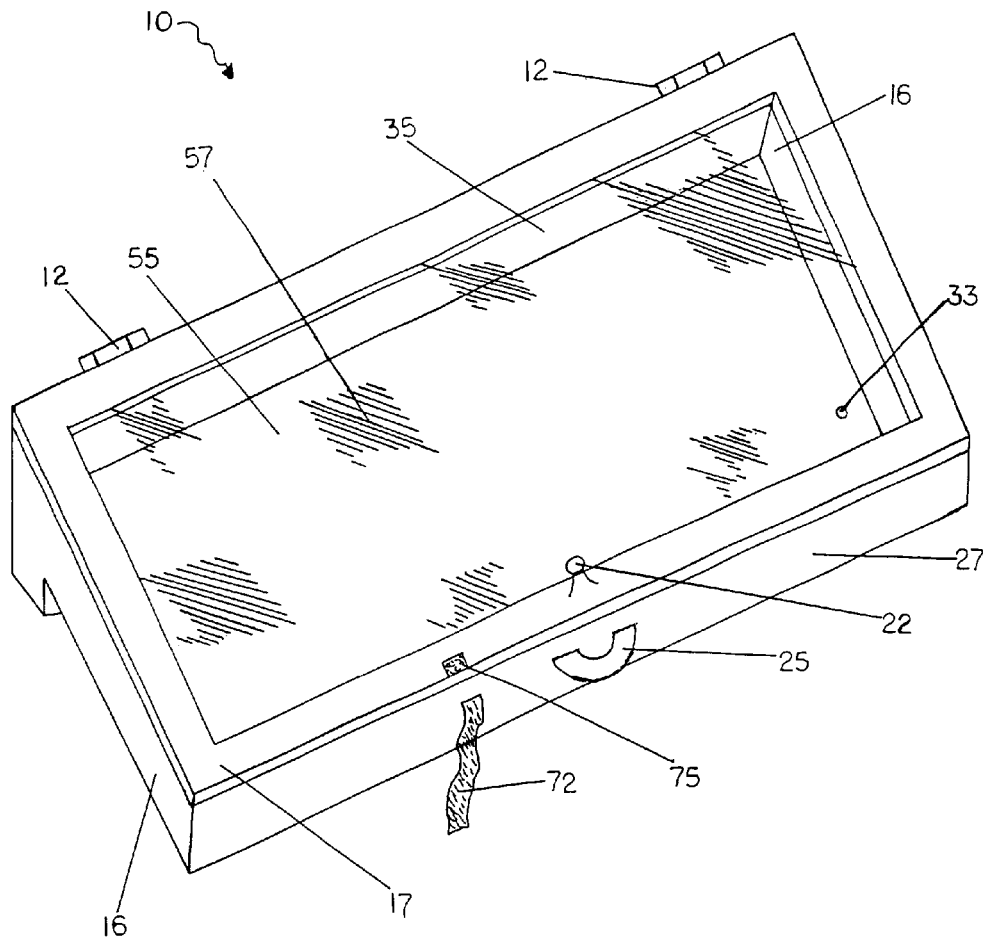
FIG. 1 is a front perspective view of my portable rectangular tabletop picnic cooler in the close position
Figure 2:
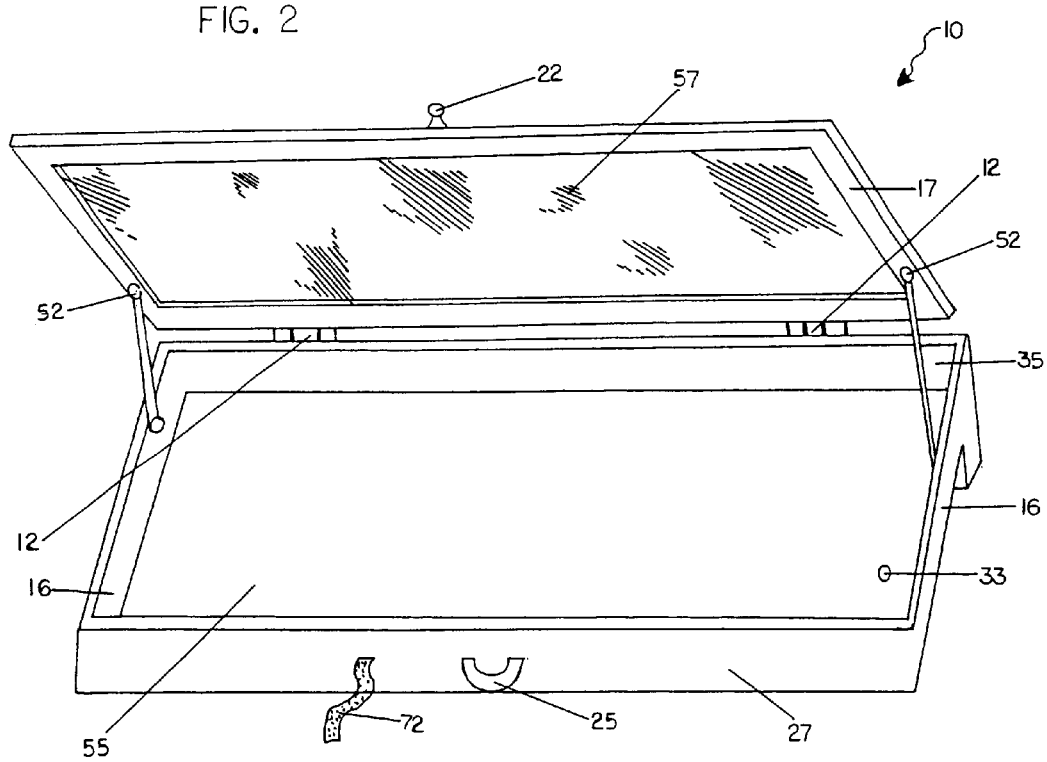
FIG. 2 is a front perspective view shows a similar cooler with the rectangular transparent lid in the open position thereof.

| DRAWING--REFERENCE NUMERALS | |
|---|---|
| 10 PORTABLE RECTANGULAR TABLE TOP COOLER | 27 FRONT PERIMETER WALL |
| 12 HINGE | 33 DRAIN HOLE |
| 16 SIDE WALL | 35 REAR PERIMETER WAL |
| 17 RECTANGULAR LID | 52 INTERIOR LID HINGE |
| 19 LIP | 55 RECTANGULAR BASE |
| 22 KNOB HANDLE | 57 TRANSPARENT MEANS |
| 25 CARRYING HANDLE | 72 FLEXIBLE STRAP |
| 75 MEANS TO RECEIVE FLEXIBLE STRAP | 77 DRAIN HOLE CAP |

DESCRIPTION OF THE PREFERRED EMBODIMENT

In this respect, before explaining one embodiment of the invention in detail, it is to be understood that the present invention is not limited in its application to the details of construction and to the arrangements of the components set forth in the following description or illustrated in the drawings. The invention is capable of other embodiments and of being manufactured in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for he designing of other structures, methods, and systems for carrying out the several purposes of the present invention. It is important therefore, that the claims be regarded as including such equivalent constructions insofar as they do not depart from the spirit and scope of the present invention.

Figure 4:
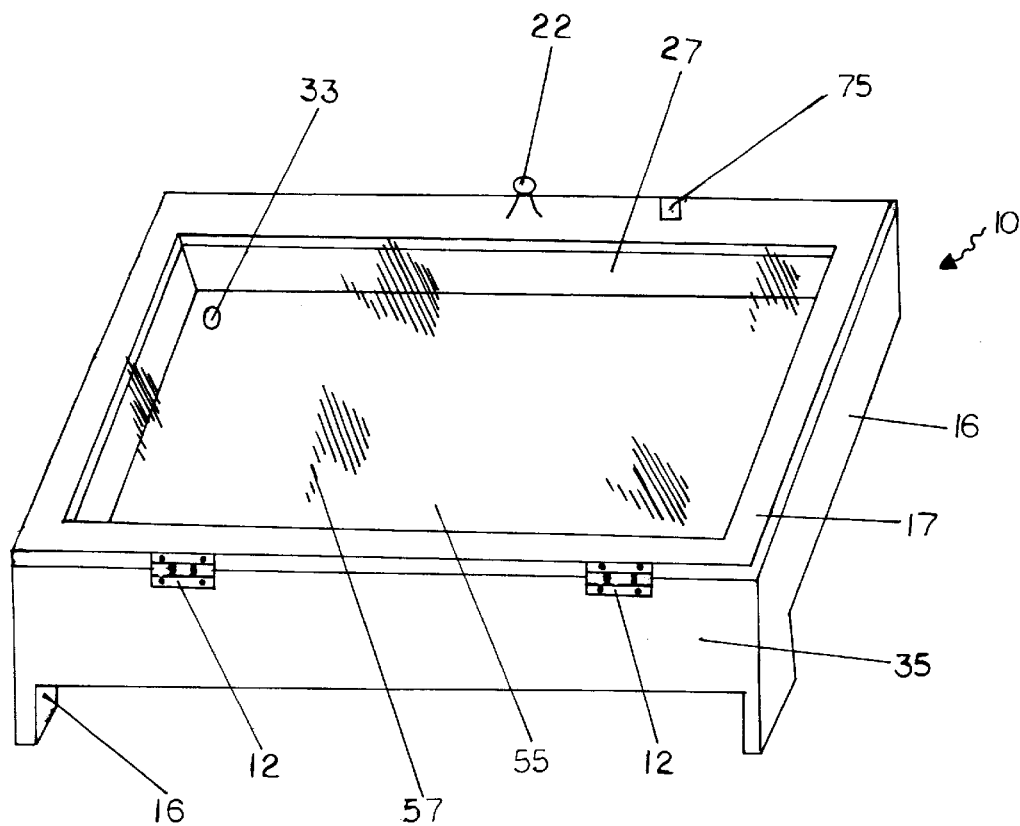
FIG. 4 is a rear perspective view thereof
Figure 5:
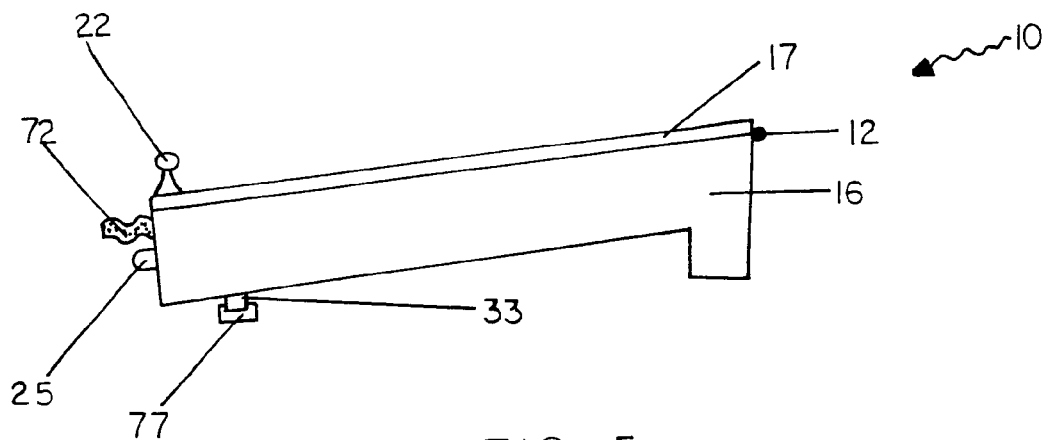
FIG. 5 is a right side view thereof
Figure 6:
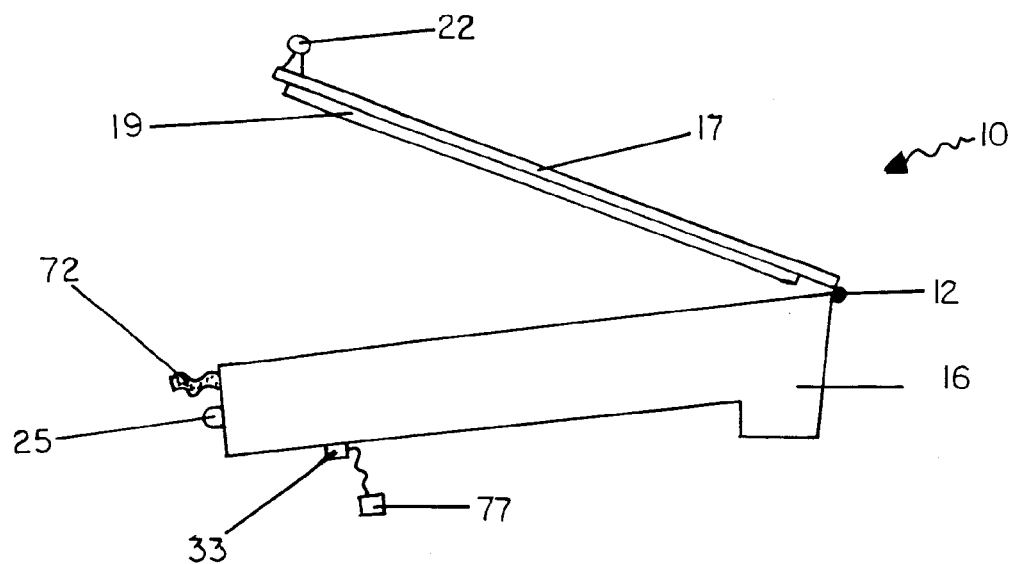
FIG. 6 is a right side view with the rectangular lid in the open position thereof.

The present invention designated in FIG. 1 by the numeral 10 is comprised of a portable rectangular tabletop picnic cooler. Cooler 10 comprising of a base 55 with upwardly extending perimeter front 27, rear 35 and sidewalls 16 that define a rectangular cavity within said perimeter walls. FIG. 4 illustrates a rear perspective view of cooler 10, to the rear of said cooler, said side walls extend downwardly a short distance from said base, as to give the appearance of support legs. Now referring to FIG. 5, shown is a right side view of cooler 10, which shows right side wall 16 extending downwardly a short distance give cooler 10 and L-shape configuration. Also show in FIG. 5 is a drain hole 33 that extends through said base 55 and extends past said base a short distance. Under said base 55, a drain cap 77, shown in the closed position, is coupled to said drain hole 33 by a coupling means. FIG. 6 shows said drain hole 33 is open and said drain cap 77 is removed. Also visible in FIG. 5 is the L-shape configuration of cooler 10, this allows melted ice water to be more easily directed to said drain hole 33.

Figure 3:
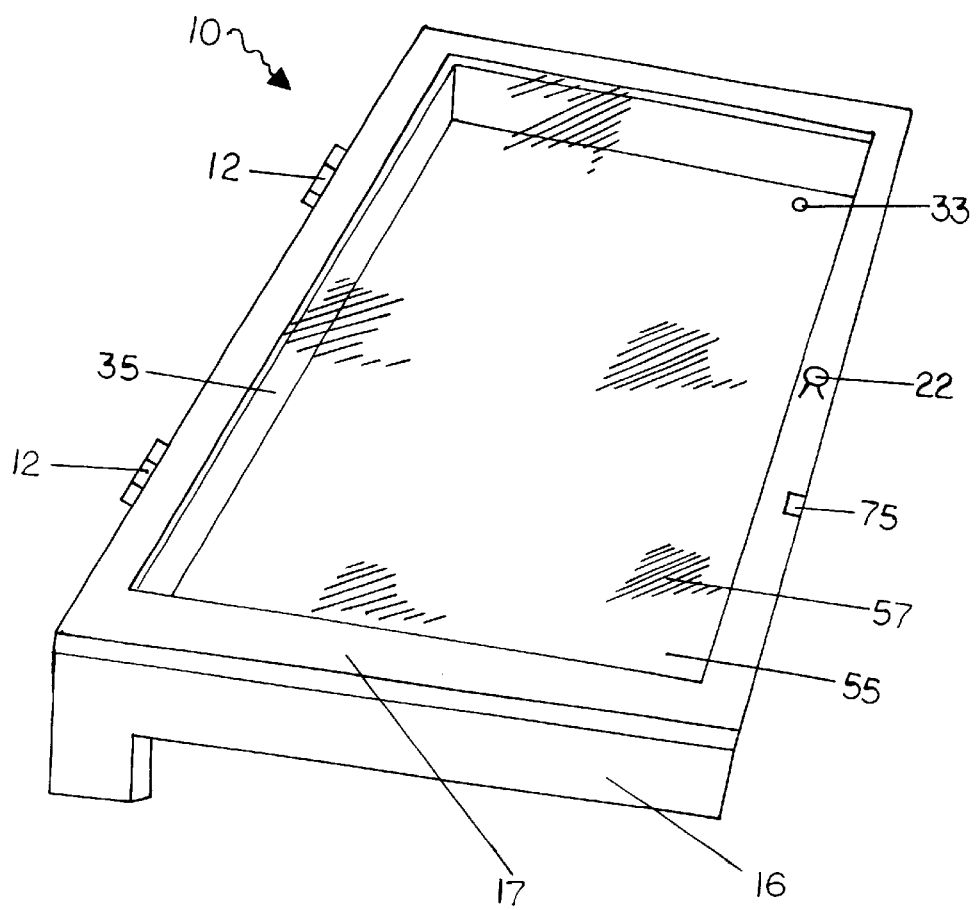
FIG. 3 is a left perspective view thereof

Refer to FIG. 1. A Rectangular lid 17 is comprised of four perimeter walls that are in the configuration of a picture frame or a likeness thereof. A rectangular transparent material 57 or means is secured within the interior space defined by said perimeter walls of lid 17. Said rectangular transparent material 57 is secured to said lid 17 by a coupling means. One side of said hinging means 52 is coupled to the bottom said side walls of lid 17, the other end of said hinging means 52 is coupled to the interior of said side walls 16, this hinging means allows said lid to be opened and to remain open in a multitude of different angles. Referring to FIG. 3 Said lid 17 is coupled to the top of the back wall of the perimeter wall 35*b* by a hinging means 12. Referring to FIG. 6 Said lid 17 has a defining lip 19 that extends downwardly a short distance around the perimeter of the bottom of said lid 17. When said lid 17 is closed down onto the top of said perimeter wall 27, said rear wall 35 and said side walls 16, the outer perimeter walls of the defining lip 19 is designed to mate with the interior top walls of said front wall 27, said rear wall 35 and said side walls 16, providing an almost airtight seal.

Referring to FIG. 1 Coupled to the top front of said lid 17 is a knob handle 22. A carrying handle 25 is coupled to the exterior front wall of said perimeter wall 27. A flexible strap 72 is coupled to the exterior front wall of said perimeter wall 27 and a means to receive 75 said flexible strap 72 is coupled to the top front said lid 17.

Although the present invention has been described in considerable detail and with reference to certain preferred versions, other versions are possible. For example, while a rectangular shape for the base and specific lid have been described, alternative means may be substituted for the handles, straps and hinges and may have some of the same advantages. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What I claim as my invention is:

1. A portable rectangular tabletop picnic cooler comprising:

a base being generally rectangular;

a perimeter wall generally being rectangular comprising of a front, a rear and a pair of side walls that extend between said front and said rear wall, said perimeter wall generally being rectangular that upwardly extends around said rectangular base, said base and said perimeter walls terminating along a common edge and secured together to provide an interior space being generally rectangular, said sidewalls extend downwardly a short distance at the rear of the cooler only these extensions from said side walls are legs under said base creating an L-shape configuration when viewing the cooler from a side view a lid being generally rectangular; said lid having four perimeter walls comprising of a front, a back, and a pair of sidewalls that extend between said front and said back walls; said lid being constructed in a picture frame configuration.

2. The cooler in claim 1, wherein a material with transparent means is secured by a coupling means to the back of said lid being coupled to back wall of said perimeter rear wall by a hinge means to top edge, where said hinging means allows said lid upward and downward movement.

3. The cooler in claim 1, wherein a drain hole is located through said base and extends downwardly from said base a short distance; a drain hole cap secured under said base to the drain hole body by an attachment means.

4. The cooler in claim 1, wherein a flexible strap is coupled to the exterior wall of said perimeter front wall by a coupling means; a means to receive said flexible strap is coupled to the top front of said lid.

5. The cooler in claim 1, wherein a handle means is coupled to the top front of said lid.

6. The cooler in claim 1, wherein a carrying handle is coupled to the exterior front wall of said front perimeter wall that extends upward from said base.

7. The cooler in claim 1, where said hinging means allows said lid to be opened and to remain in the open position at a multitude of different angles.

* * * * *